United States Patent Office 3,294,650
Patented Dec. 27, 1966

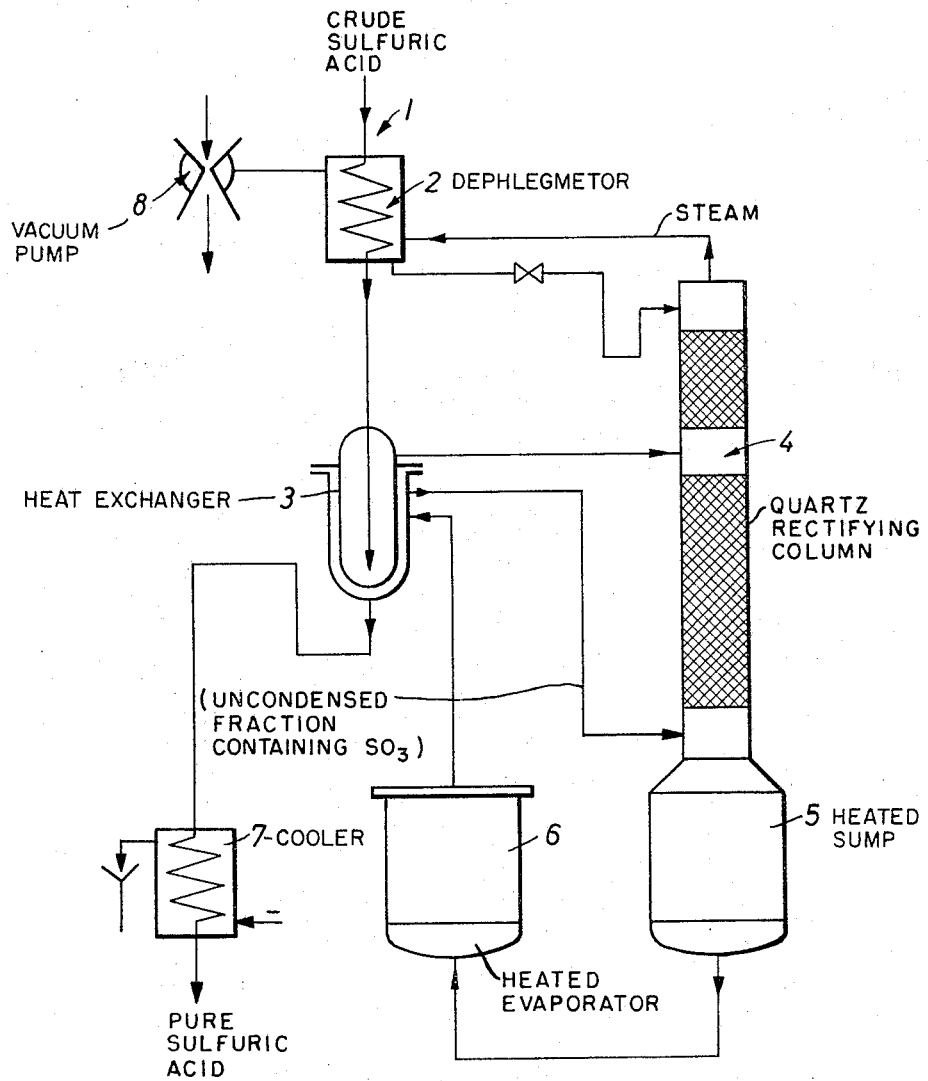

3,294,650
PROCESS FOR CONCENTRATING SULFURIC ACID IN A QUARTZ RECTIFYING COLUMN
Rolf Manteufel, Frankfurt am Main, Germany, assignor to Firma Heraeus Quarzschmelze G.m.b.H., Hanau (Main), a corporation
Filed July 31, 1963, Ser. No. 298,925
Claims priority, application Germany, Aug. 13, 1962, H 46,635
4 Claims. (Cl. 203—22)

This invention relates to a process for the continuous distillation of mixtures of substances, more particularly for the continuous distillation of acids, such as sulfuric acid, in equipment made of ceramic materials, and to an apparatus for carrying this process into effect.

It is known to carry out the distillation or rectification of mixtures of substances in such a way that the mixture flows into a rectifier column at a point of suitable concentration and is separated in the column into the fractions of different boiling point, the lower boiling fraction being removed at the top of this column, while the higher boiling fraction is directly removed from a heated distillation flask arranged at the base of this column or is removed as vapour, particularly in the case where solid fractions are to be recovered also.

If such processes are carried out in equipment made of ceramic material, in particular glass, quartz glass and/or quartz material, difficulties arise because the capacity of these apparatus is considerably restricted so that the throughput is low. However, since the total quantity of heat for the individual steps of the process, namely, for heating and vaporising the mixtures of substances to be separated and in addition for the evaporation of the return flow necessary for the rectification, must be provided from the distillation flask disposed at the base of the column, the only possibility which has hitherto existed of increasing the throughput of such an apparatus was either to connect suitable preheated distillation flasks or even several distillation flasks in parallel with the mixture of substances flowing to the apparatus. As well as involving an additional energy consumption such measures always involve a considerable expenditure on equipment, especially as the removal of the product in vapor form from the distillation flask renders special control elements necessary since a partial stream of the vapor has to flow through the rectifier column. In addition, in such a construction, there exists the danger that decomposition of the fraction of higher boiling point may lead to gaseous products which are removed with the vapor of the end product to be recovered, and these can then only be separated from one another by further expenditure on equipment and energy.

Since it is usually particularly very reactive compounds of high boiling point which are distilled in equipment made of ceramic materials, further difficulties arise in sealing the connections in the apparatus. For this reason, the apparatus is made to operate as far as possible under vacuum, in order to avoid discharge of vapor at the connections. Consequently, the inert gases to be exhausted from the product condenser connected on the output side of the distillation flask must then also be at the lowest possible temperature in order to keep as low as possible the losses of product due to the low partial pressure prevailing in the system. For cooling both the gases formed by possible decomposition and also the air entering because of leaky connections, to below the temperature in the product condenser, additional energy and changes in apparatus are consequently unavoidable in most cases.

The object of the invention is to avoid these disadvantages and at the same time to restrict the expenditure necessary on equipment used in this process to a minimum.

According to the invention this problem is solved by extracting in liquid form the product of higher boiling point formed during the rectification and evaporating it again and recondensing it, the total heat of condensation of this product being used for heating and partially evaporating the mixture of substances entering the system for rectification, the fractions remaining in vapor form during the condensation being returned for rectification.

The particular advantage of the process according to the invention consists in that no losses can arise in respect of the vapor produced which is to be condensed and the gases which may be formed on further evaporation due to decomposition since they are returned to the rectifier column and are absorbed to the maximum degree therein. In this way, it becomes possible for the quantity of heat consumed by the decomposition to be recovered inside the apparatus without additional apparatus.

Since the heat of condensation necessary for the production of the return flow can be utilized for heating the mixture of substances to be distilled, it is only the heat losses of the apparatus itself and the quantities of heat discharged with the individual end fractions and not recovered in the apparatus which have to be replaced in the process according to the invention.

By this means, there is provided on the one hand the best possible utilization of heat where the heating capacity is particularly limited that is in ceramic equipment. On the other hand, the control of the apparatus is substantially simplified, since only the supply of the mixture of substances to be distilled and, in certain circumstances, the return flow to the top of the column, which have to be regulated.

The process according to the invention is explained below by way of illustration only with reference to the distillation of sulfuric acid in an apparatus made of quartz glass or quartz material for the production of analytically pure sulfuric acid, this apparatus being shown diagrammatically in the accompanying drawing.

Industrial sulfuric acid of any desired concentration is introduced through the pipe 1 into a dephlegmator 2, where it is heated, and is then transferred into an indirect heat exchanger 3 having a cooling path for passage therethrough of vapor for condensation, and a heating path for passage therethrough of the sulfuric acid feed to be heated. From the heat exchanger the sulfuric acid flows in the form of a liquid-vapor mixture into the rectifier column 4, where it is split up into the two fractions. The sulfuric acid of which the concentration is increased then flows to a heated sump 5 which is connected on the liquid side to an evaporator 6. From this evaporator 6, which is heated, the sulfuric acid vapor is passed to the heat exchanger 3. Condensation then takes place because of the mixture of fresh material flowing into the heat exchanger, the uncondensed fractions being returned to a vapor space beneath the rectifier column 4 as shown. These uncondensed fractions also contain the sulfur trioxide formed in certain circumstances by decomposition of the concentrated sulfuric acid in the evaporator 6, and this trioxide is again absorbed in the column by the downwardly flowing sulfuric acid. The fraction which is condensed in the heat exchanger 3 and which consists of analytically pure sulfuric acid may flow through a water-cooled liquid cooler 7 and is removed at this point from the system.

The fraction of lower boiling point, i.e. the steam, discharges at the top of the rectifier column 4 to be dephlegmator 2, where it is partially condensed by the fresh mixture flowing into the apparatus and is supplied as return flow to the head of the column 4. The uncondensed fraction and the inert gases can be extracted by suction from the dephlegmator 2 by means of a vacuum pump 8.

What I claim is:

1. A process for the continuous distillation of a crude sulfuric acid in a quartz rectifying column to produce analytically pure sulfuric acid, including steps of rectifying the crude sulfuric acid in said rectifying column to produce a high and a low-boiling point fraction in said column, withdrawing high boiling point friction as a liquid, evaporating withdrawn liquid and condensing a portion of the resulting vapor while leaving a portion of said vapor uncondensed, utilizing all the heat of said condensation to partially evaporate said crude sulfuric acid and form a gas-liquid mixture thereof, introducing said partially evaporated mixture into the rectifying step, introducing said uncondensed vapor from the condensation of said high boiling fraction to the rectification step and withdrawing condensate produced by said condensation as the analytically pure sulfuric acid.

2. A process for the continuous distillation of crude sulfuric acid to produce analytically pure sulfuric acid in apparatus of a material selected from quartz glass and quartz material, which comprises:
 (a) rectifying the crude sulfuric acid in said apparatus to produce a high and a low boiling fraction;
 (b) withdrawing the high boiling fraction as liquid;
 (c) evaporating the liquid in an evaporator;
 (d) condensing the balance of the resulting vapor, leaving a portion thereof uncondensed, by indirect heat exchange with said crude sulfuric acid in an indirect heat exchanger, to evaporate only part of the crude sulfuric acid;
 (e) introducing the partially evaporated crude sulfuric acid into said rectification step;
 (f) returning said uncondensed vapor from said condensation to the rectification step and in the rectification step conducting it countercurrent to downwardly flowing liquid; and
 (g) withdrawing all the condensate resulting from said condensation as the analytically pure sulfuric acid.

3. A process as claimed in claim 2 in which said rectification step is performed in a rectification column, and said withdrawal of high boiling point fraction is from the bottom of the rectification column.

4. A process as claimed in claim 3 in which said uncondensed vapor is transferred from the heat exchanger to the bottom portion of the rectfiication column and conducted counter-currently therein to the downwardly flowing liquid.

References Cited by the Examiner

UNITED STATES PATENTS

| | | | |
|---|---|---|---|
| 1,419,008 | 6/1922 | Baum | 203—86 |
| 1,969,793 | 8/1934 | Hechanbleikner | 23—274 |
| 2,124,729 | 7/1938 | Castner et al. | 23—274 |
| 2,341,812 | 2/1944 | Pierotti et al. | 203—84 |
| 2,663,681 | 12/1953 | Hull et al. | 203—22 |
| 2,730,431 | 1/1956 | Haltmeier | 23—167 |

FOREIGN PATENTS 400,300  9/1924  Germany.

NORMAN YUDKOFF, *Primary Examiner.*

F. E. DRUMMOND, *Assistant Examiner.*